(12) United States Patent
Merced-Grafals et al.

(10) Patent No.: US 12,073,051 B2
(45) Date of Patent: Aug. 27, 2024

(54) TOUCH SENSOR PANEL WITH STAGGERED TOUCH ELECTRODES

(71) Applicant: Apple Inc., Cupertino, CA (US)

(72) Inventors: Emmanuelle J. Merced-Grafals, San Jose, CA (US); Matthew D. Hollands, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 18/180,773

(22) Filed: Mar. 8, 2023

(65) Prior Publication Data

US 2023/0325043 A1 Oct. 12, 2023

Related U.S. Application Data

(60) Provisional application No. 63/362,738, filed on Apr. 8, 2022.

(51) Int. Cl.
*G06F 3/044* (2006.01)
(52) U.S. Cl.
CPC .......... G06F 3/0448 (2019.05); *G06F 3/0446* (2019.05)
(58) Field of Classification Search
CPC .............................. G06F 3/0448; G06F 3/0446
USPC .......................................................... 345/174
See application file for complete search history.

(56) References Cited

U.S. PATENT DOCUMENTS

| 8,319,747 | B2 | 11/2012 | Hotelling et al. | |
| 10,055,060 | B2 | 8/2018 | Lee et al. | |
| 10,162,227 | B2 | 12/2018 | Yang et al. | |
| 2015/0049053 | A1* | 2/2015 | Kim | G06F 3/0443 345/174 |
| 2016/0320886 | A1* | 11/2016 | Kim | G06F 3/047 |
| 2019/0294274 | A1* | 9/2019 | Cho | G06F 3/0416 |
| 2021/0034184 | A1 | 2/2021 | Lin et al. | |
| 2022/0197439 | A1* | 6/2022 | He | G06F 3/0448 |

FOREIGN PATENT DOCUMENTS

| CN | 103472961 B | 12/2016 |
| CN | 208985126 U | 6/2019 |

* cited by examiner

*Primary Examiner* — Mark Edwards
(74) *Attorney, Agent, or Firm* — Kubota & Basol LLP

(57) ABSTRACT

A touch sensor panel comprises a plurality of touch electrodes in a two-dimensional array, the plurality of touch electrodes including first and second touch electrodes disposed along a first axis. The first and second touch electrodes can each include one or more first protrusions along a first side and one or more second protrusions along a second side, opposite the first side. The one or more first protrusions along the first side can be offset along a second axis, orthogonal to the first axis, from the one or more second protrusions along the second side. The first and second touch electrodes can tessellate such that the one or more first protrusions along the first side of the first touch electrode interlock with the one or more second protrusions along the second side of the second touch electrode.

20 Claims, 9 Drawing Sheets

TOUCH SENSOR PANEL WITH STAGGERED TOUCH ELECTRODES

CROSS REFERENCE TO RELATED APPLICATION

This application claims the benefit of U.S. Provisional Application No. 63/362,738, filed Apr. 8, 2022, the entire disclosure of which is herein incorporated by reference for all purposes.

FIELD OF THE DISCLOSURE

This relates generally to touch sensor panels, and more particularly, to touch sensor panels including staggered touch electrodes and techniques for reducing error and increasing mutual capacitance.

BACKGROUND OF THE DISCLOSURE

Many types of input devices are presently available for performing operations in a computing system, such as buttons or keys, mice, trackballs, joysticks, touch sensor panels, touch screens and the like. Touch screens, in particular, are popular because of their ease and versatility of operation as well as their declining price. Touch screens can include a touch sensor panel, which can be a clear panel with a touch-sensitive surface, and a display device such as a liquid crystal display (LCD), light emitting diode (LED) display or organic light emitting diode (OLED) display that can be positioned partially or fully behind the panel so that the touch-sensitive surface can cover at least a portion of the viewable area of the display device. Touch screens can allow a user to perform various functions by touching the touch sensor panel using a finger, stylus or other object at a location often dictated by a user interface (UI) being displayed by the display device. In general, touch screens can recognize a touch and the position of the touch on the touch sensor panel, and the computing system can then interpret the touch in accordance with the display appearing at the time of the touch, and thereafter can perform one or more actions based on the touch. In the case of some touch sensing systems, a physical touch on the display is not needed to detect a touch. For example, in some capacitive-type touch sensing systems, fringing electrical fields used to detect touch can extend beyond the surface of the display, and objects approaching near the surface may be detected near the surface without actually touching the surface.

Capacitive touch sensor panels can be formed by a matrix of partially or fully transparent or non-transparent conductive plates (e.g., touch electrodes) made of materials such as Indium Tin Oxide (ITO). In some examples, the conductive plates can be formed from other materials including conductive polymers, metal mesh, graphene, nanowires (e.g., silver nanowires) or nanotubes (e.g., carbon nanotubes). It is due in part to their substantial transparency that some capacitive touch sensor panels can be overlaid on a display to form a touch screen, as described above. Some touch screens can be formed by at least partially integrating touch sensing circuitry into a display pixel stack-up (i.e., the stacked material layers forming the display pixels).

SUMMARY OF THE DISCLOSURE

This relates generally to touch sensor panels including a staggered touch electrode architecture to improve touch sensing performance. In some examples, the touch sensor panel includes a plurality of touch electrodes in a two-dimensional array, the plurality of touch electrodes including a first touch electrode and a second touch electrode disposed along a first axis. In some examples, the first touch electrode and the second touch electrode each includes one or more first protrusions along a first side and one or more second protrusions along a second side, opposite the first side. In some examples, the one or more first protrusions along the first side are offset along a second axis, orthogonal to the first axis, from the one or more second protrusions along the second side. In some examples, the first touch electrode and the second touch electrode tessellate such that the one or more first protrusions along the first side of the first touch electrode interlock with the one or more second protrusions along the second side of the second touch electrode.

DETAILED DESCRIPTION

In the following description of examples, reference is made to the accompanying drawings which form a part hereof, and in which it is shown by way of illustration specific examples that can be practiced. It is to be understood that other examples can be used and structural changes can be made without departing from the scope of the disclosed examples.

This relates generally to touch sensor panels including a staggered touch electrode architecture to improve touch sensing performance. In some examples, the touch sensor panel includes a plurality of touch electrodes in a two-dimensional array, the plurality of touch electrodes including a first touch electrode and a second touch electrode disposed along a first axis. In some examples, the first touch electrode and the second touch electrode each includes one or more first protrusions along a first side and one or more second protrusions along a second side, opposite the first side. In some examples, the one or more first protrusions along the first side are offset along a second axis, orthogonal to the first axis, from the one or more second protrusions along the second side. In some examples, the first touch electrode and the second touch electrode tessellate such that the one or more first protrusions along the first side of the first touch electrode interlock with the one or more second protrusions along the second side of the second touch electrode. As used herein, the expression tessellate and its derivatives (e.g., tessellating, tessellation, etc.) refers to a concept of interlocking shapes of touch electrodes (tiling) to cover the surface of a touch sensor panel without overlapping and without gaps (e.g., aside from some small gaps for electrical separation). As described herein in some examples, self-tessellating refers to periodic tiling in which the tessellation can be achieved with a uniform shape without rotation or reflection.

Figure 1A:
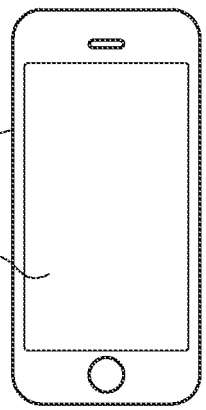
FIGS. 1A-1E illustrate example systems that can include a touch screen according to examples of the disclosure.
Figure 1B:
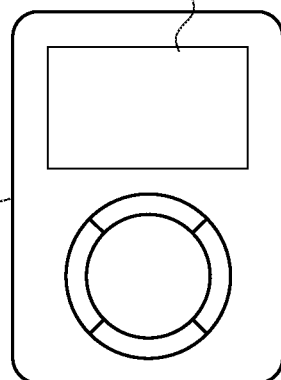
Figure 1C:
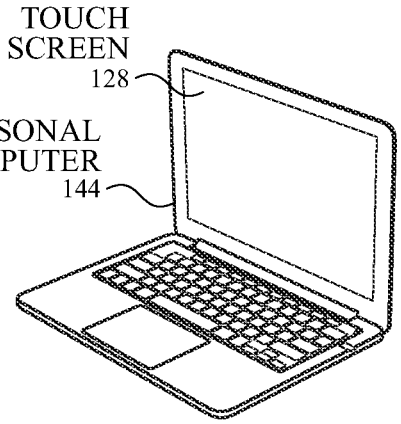
Figure 1D:
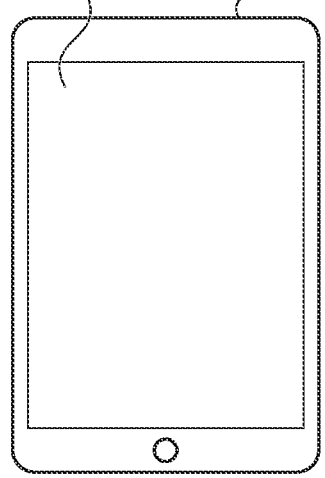
Figure 1E:
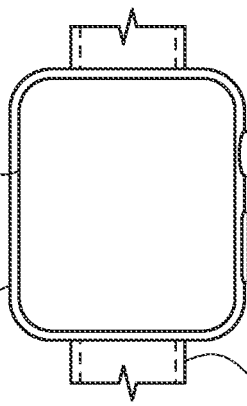

FIGS. 1A-1E illustrate example systems that can include a touch screen according to examples of the disclosure. FIG. 1A illustrates an example mobile telephone 136 that includes a touch screen 124 according to examples of the disclosure. FIG. 1B illustrates an example digital media player 140 that includes a touch screen 126 according to examples of the disclosure. FIG. 1C illustrates an example personal computer 144 that includes a touch screen 128 according to examples of the disclosure. FIG. 1D illustrates an example tablet computing device 148 that includes a touch screen 130 according to examples of the disclosure. FIG. 1E illustrates an example wearable device 150 that includes a touch screen 132 and can be attached to a user using a strap 152 according to examples of the disclosure. It is understood that a touch screen can be implemented in other devices as well.

In some examples, touch screens 124, 126, 128, 130 and 132 can be based on self-capacitance. A self-capacitance based touch system can include a matrix of small, individual plates of conductive material or groups of individual plates of conductive material forming larger conductive regions that can be referred to as touch electrodes or as touch node electrodes (as described below with reference to FIG. 4B). For example, a touch screen can include a plurality of individual touch electrodes, each touch electrode identifying or representing a unique location (e.g., a touch node) on the touch screen at which touch or proximity is to be sensed, and each touch node electrode being electrically isolated from the other touch node electrodes in the touch screen/panel. Such a touch screen can be referred to as a pixelated self-capacitance touch screen, though it is understood that in some examples, the touch node electrodes on the touch screen can be used to perform scans other than self-capacitance scans on the touch screen (e.g., mutual capacitance scans). During operation, a touch node electrode can be stimulated with an alternating current (AC) waveform, and the self-capacitance to ground of the touch node electrode can be measured. As an object approaches the touch node electrode, the self-capacitance to ground of the touch node electrode can change (e.g., increase). This change in the self-capacitance of the touch node electrode can be detected and measured by the touch sensing system to determine the positions of multiple objects when they touch, or come in proximity to, the touch screen. In some examples, the touch node electrodes of a self-capacitance based touch system can be formed from rows and columns of conductive material, and changes in the self-capacitance to ground of the rows and columns can be detected, similar to above. In some examples, a touch screen can be multi-touch, single touch, projection scan, full-imaging multi-touch, capacitive touch, etc.

In some examples, touch screens 124, 126, 128, 130 and 132 can be based on mutual capacitance. A mutual capacitance based touch system can include electrodes arranged as drive and sense lines that may cross over each other on different layers (in a double-sided configuration), or may be adjacent to each other on the same layer (e.g., as described below with reference to FIG. 4A). The crossing or adjacent locations can form touch nodes. During operation, the drive line can be stimulated with an AC waveform and the mutual capacitance of the touch node can be measured. As an object approaches the touch node, the mutual capacitance of the touch node can change (e.g., decrease). This change in the mutual capacitance of the touch node can be detected and measured by the touch sensing system to determine the positions of multiple objects when they touch, or come in proximity to, the touch screen. As described herein, in some examples, a mutual capacitance-based touch system can form touch nodes from a matrix of small, individual plates of conductive material.

In some examples, touch screens 124, 126, 128, 130 and 132 can be based on mutual capacitance and/or self-capacitance. The electrodes can be arranged as a matrix of small, individual plates of conductive material (e.g., as in touch node electrodes 408 in touch screen 402 in FIG. 4B) or as drive lines and sense lines (e.g., as in row touch electrodes 404 and column touch electrodes 406 in touch screen 400 in FIG. 4A), or in another pattern. The electrodes can be configurable for mutual capacitance or self-capacitance sensing or a combination of mutual and self-capacitance sensing. For example, in one mode of operation electrodes can be configured to sense mutual capacitance between electrodes and in a different mode of operation electrodes can be configured to sense self-capacitance of electrodes. In some examples, some of the electrodes can be configured to sense mutual capacitance therebetween and some of the electrodes can be configured to sense self-capacitance thereof.

Figure 2:
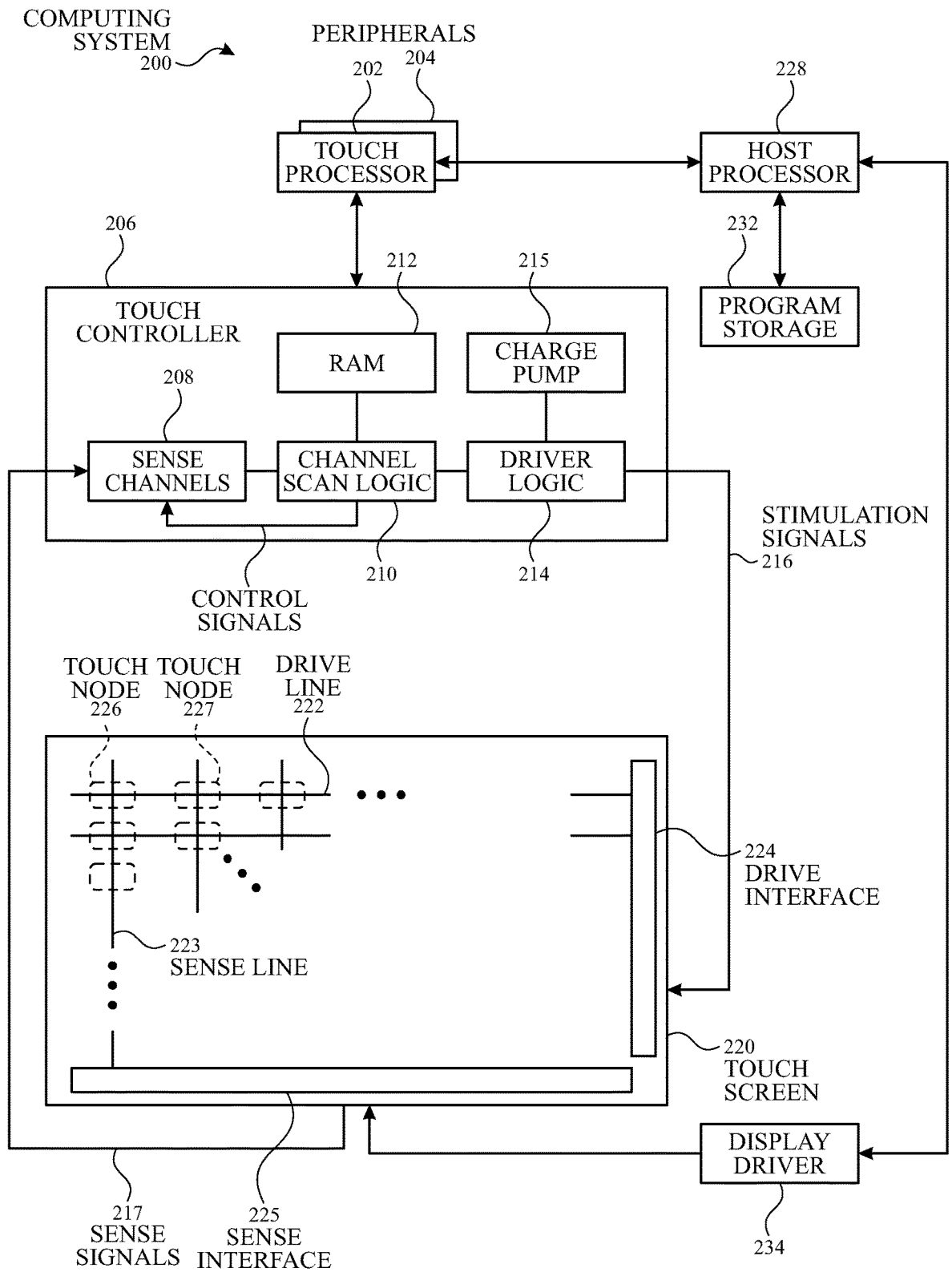
FIG. 2 illustrates an example computing system including a touch screen according to examples of the disclosure.

FIG. 2 illustrates an example computing system including a touch screen according to examples of the disclosure. Computing system 200 can be included in, for example, a mobile phone, tablet, touchpad, portable or desktop computer, portable media player, wearable device or any mobile or non-mobile computing device that includes a touch screen or touch sensor panel. Computing system 200 can include a touch sensing system including one or more touch processors 202, peripherals 204, a touch controller 206, and touch sensing circuitry (described in more detail below). Peripherals 204 can include, but are not limited to, random access memory (RAM) or other types of memory or storage, watchdog timers and the like. Touch controller 206 can include, but is not limited to, one or more sense channels 208, channel scan logic 210 and driver logic 214. Channel scan logic 210 can access RAM 212, autonomously read data from the sense channels and provide control for the sense channels. In addition, channel scan logic 210 can control driver logic 214 to generate stimulation signals 216 at various frequencies and/or phases that can be selectively applied to drive regions of the touch sensing circuitry of touch screen 220, as described in more detail below. In some examples, touch controller 206, touch processor 202 and peripherals 204 can be integrated into a single application specific integrated circuit (ASIC), and in some examples can be integrated with touch screen 220 itself.

It should be apparent that the architecture shown in FIG. 2 is only one example architecture of computing system 200, and that the system could have more or fewer components than shown, or a different configuration of components. In some examples, computing system 200 can include an energy storage device (e.g., a battery) to provide a power supply and/or communication circuitry to provide for wired or wireless communication (e.g., cellular, Bluetooth, Wi-Fi, etc.). The various components shown in FIG. 2 can be implemented in hardware, software, firmware or any combination thereof, including one or more signal processing and/or application specific integrated circuits.

Computing system 200 can include a host processor 228 for receiving outputs from touch processor 202 and performing actions based on the outputs. For example, host processor 228 can be connected to program storage 232 and a display controller/driver 234 (e.g., a Liquid-Crystal Display (LCD) driver). It is understood that although some examples of the disclosure may be described with reference to LCD displays, the scope of the disclosure is not so limited and can extend to other types of displays, such as Light-Emitting Diode (LED) displays, including Organic LED (OLED), Active-Matrix Organic LED (AMOLED) and Passive-Matrix Organic LED (PMOLED) displays. Display driver 234 can provide voltages on select (e.g., gate) lines to each pixel transistor and can provide data signals along data lines to these same transistors to control the pixel display image.

Host processor 228 can use display driver 234 to generate a display image on touch screen 220, such as a display image of a user interface (UI), and can use touch processor 202 and touch controller 206 to detect a touch on or near touch screen 220, such as a touch input to the displayed UI. The touch input can be used by computer programs stored in program storage 232 to perform actions that can include, but are not limited to, moving an object such as a cursor or pointer, scrolling or panning, adjusting control settings, opening a file or document, viewing a menu, making a selection, executing instructions, operating a peripheral device connected to the host device, answering a telephone call, placing a telephone call, terminating a telephone call, changing the volume or audio settings, storing information related to telephone communications such as addresses, frequently dialed numbers, received calls, missed calls, logging onto a computer or a computer network, permitting authorized individuals access to restricted areas of the computer or computer network, loading a user profile associated with a user's preferred arrangement of the computer desktop, permitting access to web content, launching a particular program, encrypting or decoding a message, and/or the like. Host processor 228 can also perform additional functions that may not be related to touch processing.

Note that one or more of the functions described herein, can be performed by firmware stored in memory (e.g., one of the peripherals 204 in FIG. 2) and executed by touch processor 202, or stored in program storage 232 and executed by host processor 228. The firmware can also be stored and/or transported within any non-transitory computer-readable storage medium for use by or in connection with an instruction execution system, apparatus, or device, such as a computer-based system, processor-containing system, or other system that can fetch the instructions from the instruction execution system, apparatus, or device and execute the instructions. In the context of this document, a "non-transitory computer-readable storage medium" can be any medium (excluding signals) that can contain or store the program for use by or in connection with the instruction execution system, apparatus, or device. In some examples, RAM 212 or program storage 232 (or both) can be a non-transitory computer readable storage medium. One or both of RAM 212 and program storage 232 can have stored therein instructions, which when executed by touch processor 202 or host processor 228 or both, can cause the device including computing system 200 to perform one or more functions and methods of one or more examples of this disclosure. The computer-readable storage medium can include, but is not limited to, an electronic, magnetic, optical, electromagnetic, infrared, or semiconductor system, apparatus or device, a portable computer diskette (magnetic), a random access memory (RAM) (magnetic), a read-only memory (ROM) (magnetic), an erasable programmable read-only memory (EPROM) (magnetic), a portable optical disc such a CD, CD-R, CD-RW, DVD, DVD-R, or DVD-RW, or flash memory such as compact flash cards, secured digital cards, USB memory devices, memory sticks, and the like.

The firmware can also be propagated within any transport medium for use by or in connection with an instruction execution system, apparatus, or device, such as a computer-based system, processor-containing system, or other system that can fetch the instructions from the instruction execution system, apparatus, or device and execute the instructions. In the context of this document, a "transport medium" can be any medium that can communicate, propagate or transport the program for use by or in connection with the instruction execution system, apparatus, or device. The transport medium can include, but is not limited to, an electronic, magnetic, optical, electromagnetic or infrared wired or wireless propagation medium.

Touch screen 220 can be used to derive touch information at multiple discrete locations of the touch screen, referred to herein as touch nodes. Touch screen 220 can include touch sensing circuitry that can include a capacitive sensing medium having a plurality of drive lines 222 and a plurality of sense lines 223. It should be noted that the term "lines" is sometimes used herein to mean simply conductive pathways, as one skilled in the art will readily understand, and is not limited to elements that are strictly linear, but includes pathways that change direction, and includes pathways of different size, shape, materials, etc. Drive lines 222 can be driven by stimulation signals 216 from driver logic 214 through a drive interface 224, and resulting sense signals 217 generated in sense lines 223 can be transmitted through a sense interface 225 to sense channels 208 in touch controller 206. In this way, drive lines and sense lines can be part of the touch sensing circuitry that can interact to form capacitive sensing nodes, which can be thought of as touch picture elements (touch pixels) and referred to herein as touch nodes, such as touch nodes 226 and 227. This way of understanding can be particularly useful when touch screen 220 is viewed as capturing an "image" of touch ("touch image"). In other words, after touch controller 206 has determined whether a touch has been detected at each touch nodes in the touch screen, the pattern of touch nodes in the touch screen at which a touch occurred can be thought of as an "image" of touch (e.g., a pattern of fingers touching the touch screen). As used herein, an electrical component "coupled to" or "connected to" another electrical component encompasses a direct or indirect connection providing electrical path for communication or operation between the coupled components. Thus, for example, drive lines 222 may be directly connected to driver logic 214 or indirectly connected to drive logic 214 via drive interface 224 and sense lines 223 may be directly connected to sense channels 208 or indirectly connected to sense channels 208 via sense interface 225. In either case an electrical path for driving and/or sensing the touch nodes can be provided.

Figure 3A:
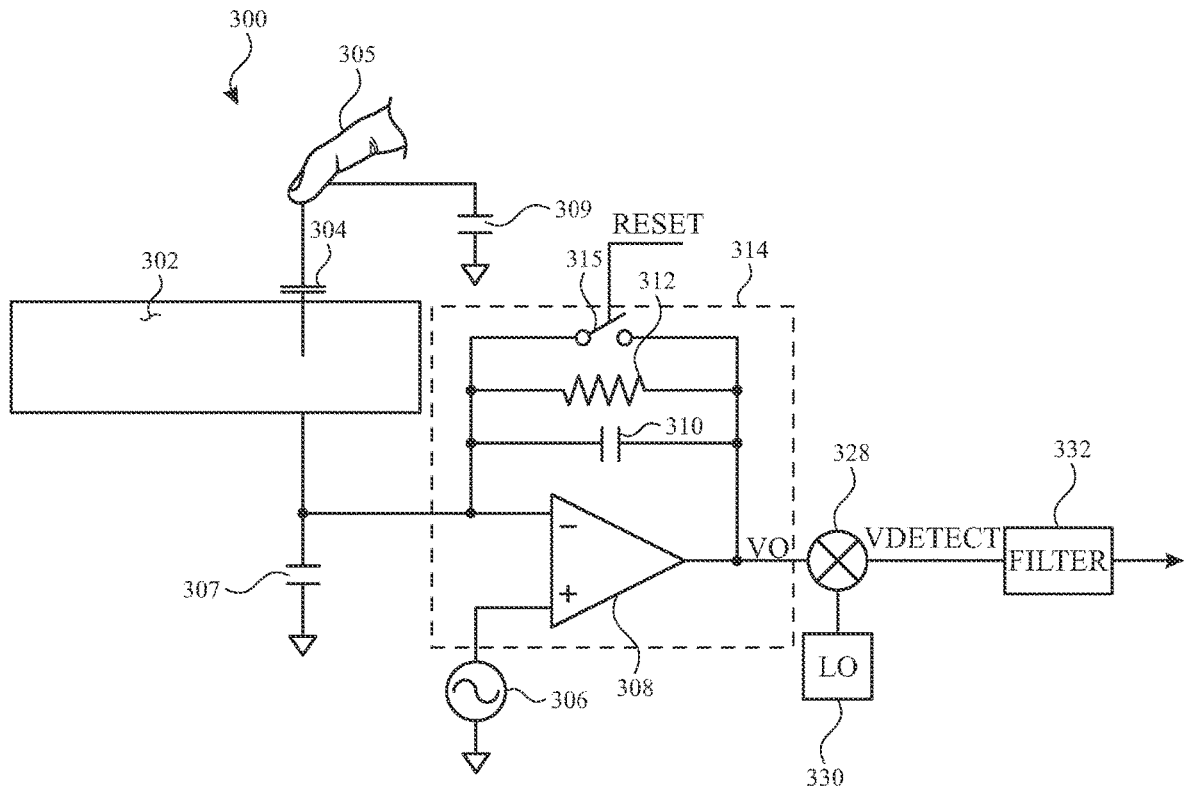
FIG. 3A illustrates an exemplary touch sensor circuit corresponding to a self-capacitance measurement of a touch node electrode and sensing circuit according to examples of the disclosure.

FIG. 3A illustrates an exemplary touch sensor circuit 300 corresponding to a self-capacitance measurement of a touch node electrode 302 and sensing circuit 314 according to examples of the disclosure. Touch node electrode 302 can correspond to a touch electrode 404 or 406 of touch screen 400 or a touch node electrode 408 of touch screen 402. Touch node electrode 302 can have an inherent self-capacitance to ground associated with it, and also an additional self-capacitance to ground that is formed when an object, such as finger 305, is in proximity to or touching the electrode. The total self-capacitance to ground of touch node electrode 302 can be illustrated as capacitance 304. Touch node electrode 302 can be coupled to sensing circuit 314. Sensing circuit 314 can include an operational amplifier 308, feedback resistor 312 and feedback capacitor 310, although other configurations can be employed. For example, feedback resistor 312 can be replaced by a switched capacitor resistor in order to minimize a parasitic capacitance effect that can be caused by a variable feedback resistor. Touch node electrode 302 can be coupled to the inverting input (−) of operational amplifier 308. An AC voltage source generating a stimulation signal 306 (Vac) can be coupled to the non-inverting input (+) of operational amplifier 308. Touch sensor circuit 300 can be configured to sense changes (e.g., increases) in the total self-capacitance 304 of the touch node electrode 302 induced by a finger or object either touching or in proximity to the touch sensor panel. Output 320 can be used by a processor to determine the presence of a proximity or touch event, or the output can be inputted into a discrete logic network to determine the presence of a proximity or touch event.

Figure 3B:
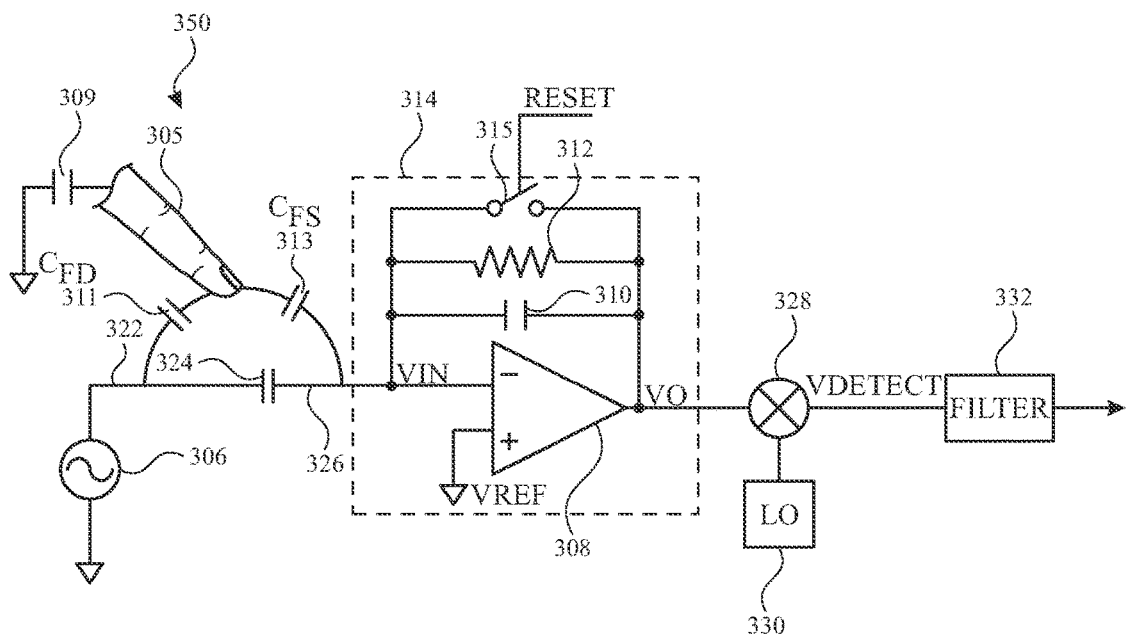
FIG. 3B illustrates an exemplary touch sensor circuit corresponding to a mutual-capacitance drive line and sense line and sensing circuit according to examples of the disclosure.

FIG. 3B illustrates an exemplary touch sensor circuit 350 corresponding to a mutual-capacitance drive line 322 and sense line 326 and sensing circuit 314 according to examples of the disclosure. Drive line 322 can be stimulated by stimulation signal 306 (e.g., an AC voltage signal). Stimulation signal 306 can be capacitively coupled to sense line 326 through mutual capacitance 324 between drive line 322 and the sense line. When a finger 305 or object approaches the touch node created by the intersection of drive line 322 and sense line 326, mutual capacitance 324 can change (e.g., decrease). This change in mutual capacitance 324 can be detected to indicate a touch or proximity event at the touch node, as described herein. The sense signal coupled onto sense line 326 can be received by sensing circuit 314. Sensing circuit 314 can include operational amplifier 308 and at least one of a feedback resistor 312 and a feedback capacitor 310. FIG. 3B illustrates a general case in which both resistive and capacitive feedback elements are utilized. The sense signal (referred to as Vin) can be inputted into the inverting input of operational amplifier 308, and the non-inverting input of the operational amplifier can be coupled to a reference voltage Vref. Operational amplifier 308 can drive its output to voltage Vo to keep Vin substantially equal to Vref, and can therefore maintain Vin constant or virtually grounded. A person of skill in the art would understand that in this context, equal can include deviations of up to 15%. Therefore, the gain of sensing circuit 314 can be mostly a function of the ratio of mutual capacitance 324 and the feedback impedance, comprised of resistor 312 and/or capacitor 310. The output of sensing circuit 314 Vo can be filtered and heterodyned or homodyned by being fed into multiplier 328, where Vo can be multiplied with local oscillator 330 to produce Vdetect. Vdetect can be inputted into filter 332. One skilled in the art will recognize that the placement of filter 332 can be varied; thus, the filter can be placed after multiplier 328, as illustrated, or two filters can be employed: one before the multiplier and one after the multiplier. In some examples, there can be no filter at all. The direct current (DC) portion of Vdetect can be used to determine if a touch or proximity event has occurred. Note that while FIGS. 3A-3B indicate the demodulation at multiplier 328 occurs in the analog domain, output Vo may be digitized by an analog-to-digital converter (ADC), and blocks 328, 332 and 330 may be implemented in a digital fashion (e.g., 328 can be a digital demodulator, 332 can be a digital filter, and 330 can be a digital NCO (Numerical Controlled Oscillator).

Referring back to FIG. 2, in some examples, touch screen 220 can be an integrated touch screen in which touch sensing circuit elements of the touch sensing system can be integrated into the display pixel stack-ups of a display. The circuit elements in touch screen 220 can include, for example, elements that can exist in LCD or other displays (LED display, OLED display, etc.), such as one or more pixel transistors (e.g., thin film transistors (TFTs)), gate lines, data lines, pixel electrodes and common electrodes. In a given display pixel, a voltage between a pixel electrode and a common electrode can control a luminance of the display pixel. The voltage on the pixel electrode can be supplied by a data line through a pixel transistor, which can be controlled by a gate line. It is noted that circuit elements are not limited to whole circuit components, such as a whole capacitor, a whole transistor, etc., but can include portions of circuitry, such as only one of the two plates of a parallel plate capacitor.

Figure 4B:
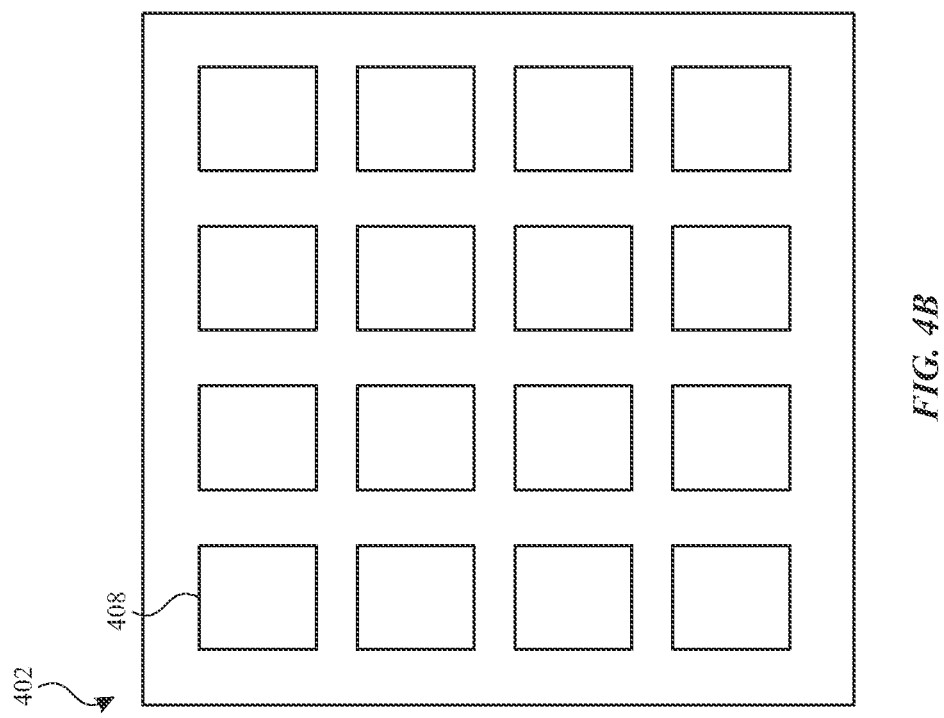
FIG. 4B illustrates touch screen with touch node electrodes arranged in a pixelated touch node electrode configuration according to examples of the disclosure.
Figure 4A:
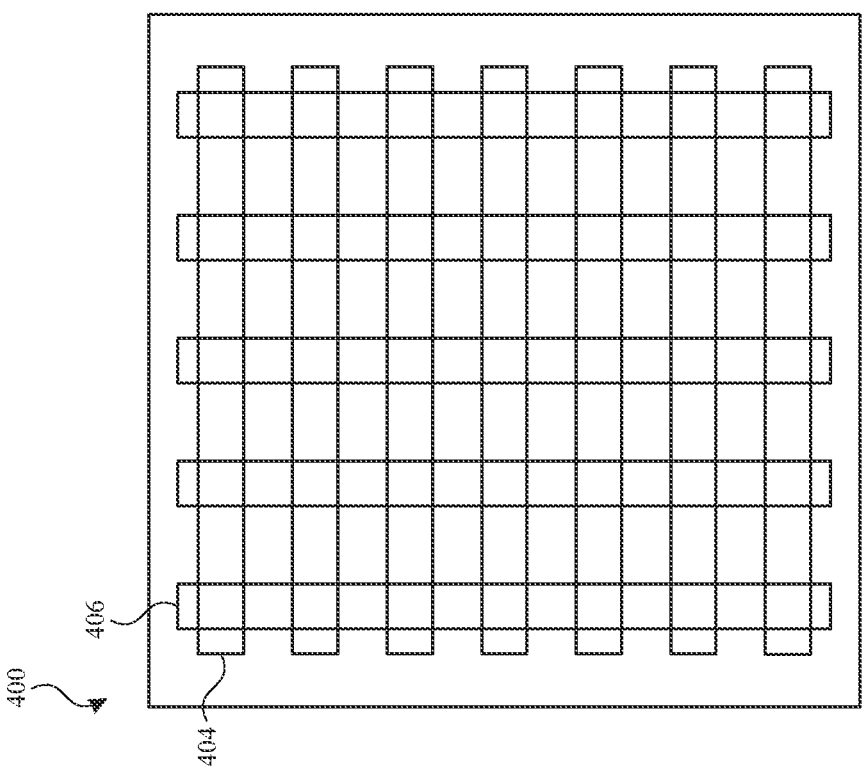
FIG. 4A illustrates touch screen with touch electrodes arranged in rows and columns according to examples of the disclosure.

FIG. 4A illustrates touch screen 400 with touch electrodes 404 and 406 arranged in rows and columns according to examples of the disclosure. Specifically, touch screen 400 can include a plurality of touch electrodes 404 disposed as rows, and a plurality of touch electrodes 406 disposed as columns. Touch electrodes 404 and touch electrodes 406 can be on the same or different material layers on touch screen 400, and can intersect with each other, as illustrated in FIG. 4A. In some examples, the electrodes can be formed on opposite sides of a transparent (partially or fully) substrate and from a transparent (partially or fully) semiconductor material, such as ITO, though other materials are possible. Electrodes displayed on layers on different sides of the substrate can be referred to herein as a double-sided sensor. In some examples, touch screen 400 can sense the self-capacitance of touch electrodes 404 and 406 to detect touch and/or proximity activity on touch screen 400, and in some examples, touch screen 400 can sense the mutual capacitance between touch electrodes 404 and 406 to detect touch and/or proximity activity on touch screen 400.

FIG. 4B illustrates touch screen 402 with touch node electrodes 408 arranged in a pixelated touch node electrode configuration according to examples of the disclosure. Specifically, touch screen 402 can include a plurality of individual touch node electrodes 408, each touch node electrode identifying or representing a unique location on the touch screen at which touch or proximity (i.e., a touch or proximity event) is to be sensed, and each touch node electrode being electrically isolated from the other touch node electrodes in the touch screen/panel, as previously described. Touch node electrodes 408 can be on the same or different material layers on touch screen 400. In some examples, touch screen 402 can sense the self-capacitance of touch node electrodes 408 to detect touch and/or proximity activity on touch screen 402, and in some examples, touch screen 402 can sense the mutual capacitance between touch node electrodes 408 to detect touch and/or proximity activity on touch screen 402.

Figure 4C:
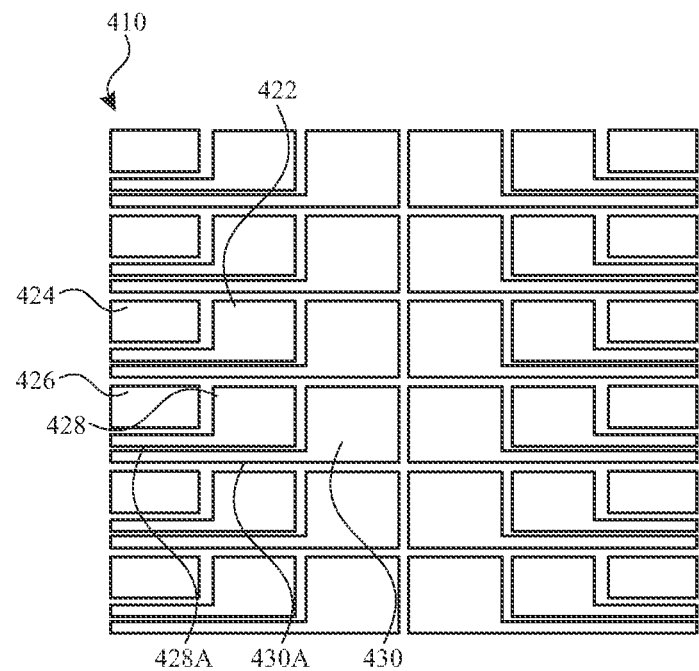
FIG. 4C illustrates touch screen with touch node electrodes and corresponding routing arranged in a pixelated touch node electrode configuration according to examples of the disclosure.
Figure 6:
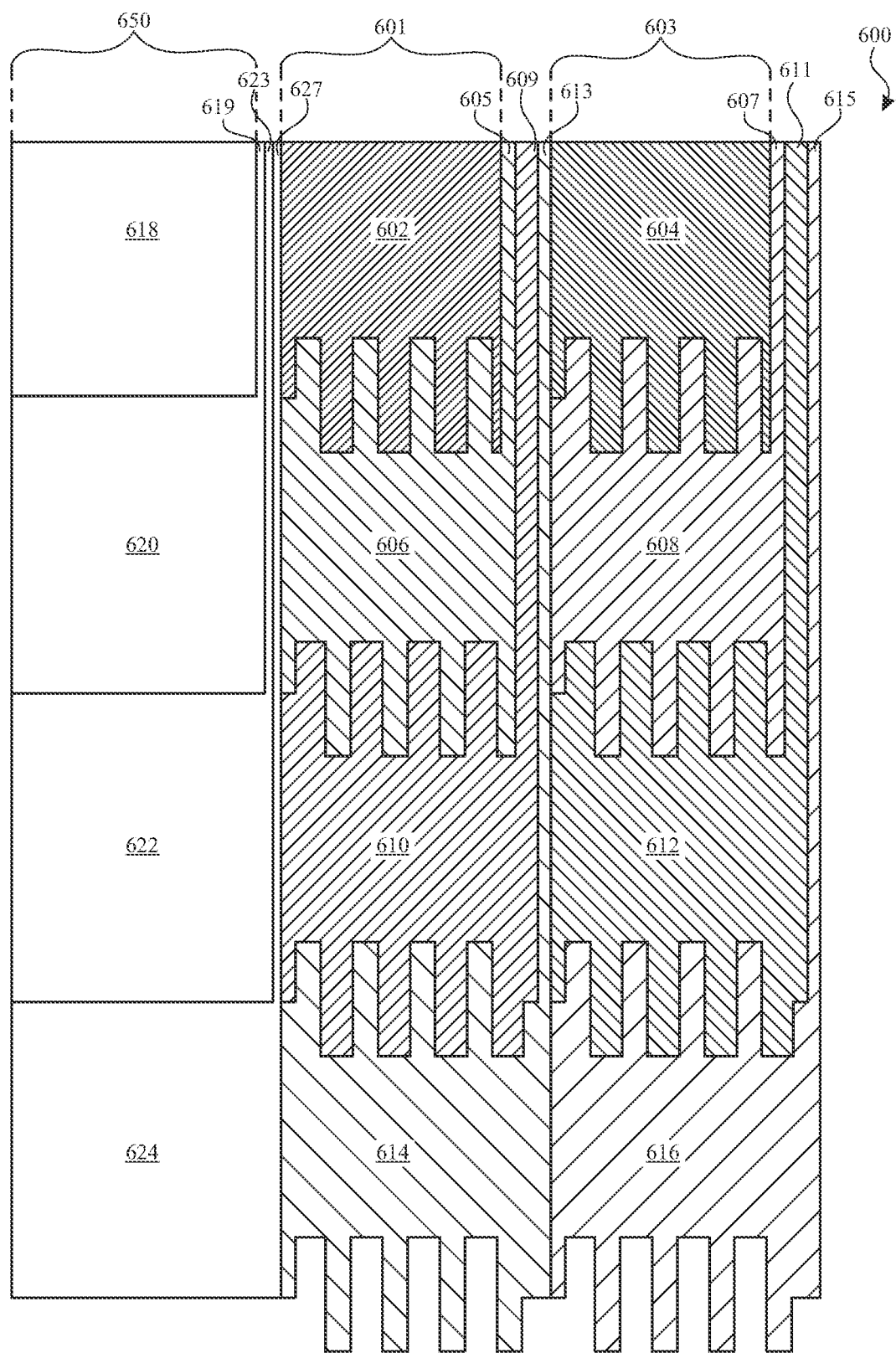
FIG. 6 illustrates a portion of an example touch sensor panel including comb-shaped touch electrodes and a routing scheme for the touch electrodes according to examples of the disclosure.
Figure 8:
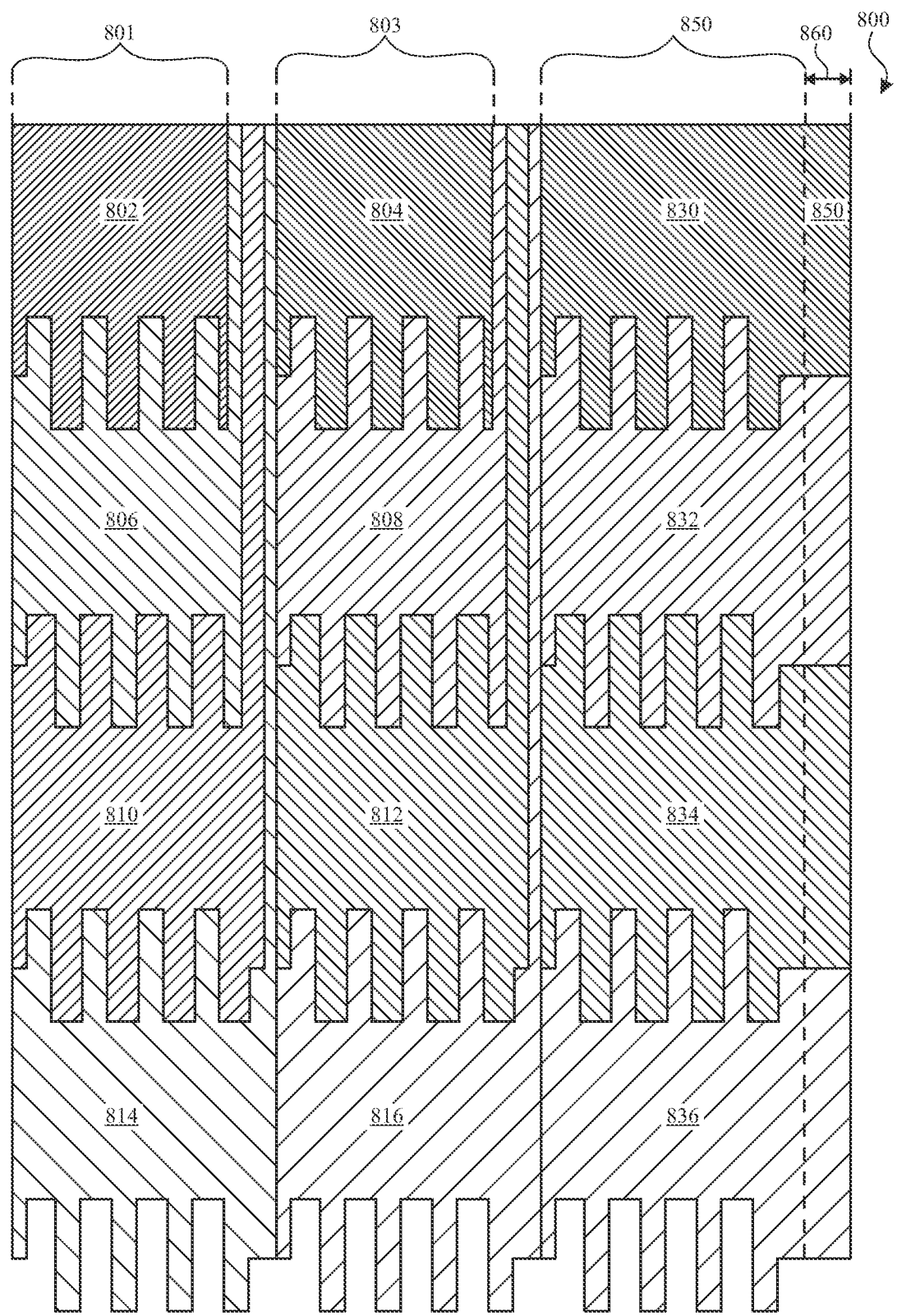
FIG. 8 illustrates a portion of another example touch sensor panel including comb-shaped touch electrodes and a routing scheme for the touch electrodes according to examples of the disclosure.

FIG. 4C illustrates touch screen 410 with touch node electrodes (e.g., including touch node electrodes 422, 424, 426, 428 and 430) and corresponding routing (e.g., including routing traces 428A and 430A) arranged in a pixelated touch node electrode configuration according to examples of the disclosure. Touch screen 410 can be similar to touch screen 402, but can also illustrate corresponding routing of the touch node electrodes. Specifically, touch screen 410 can include a plurality of individual touch node electrodes, each touch node electrode identifying or representing a unique location on the touch screen at which touch or proximity (i.e., a touch or proximity event) is to be sensed, and each touch node electrode being electrically isolated from the other touch node electrodes in the touch screen/panel, as previously described. The touch nodes can be routed to edges of the touch screen 410 (and from the edges of the touch screen 410 to touch controller 206). For example, touch node electrode 428 can be routed to the edge of touch screen 410 via routing trace 428A and touch node electrode 430 can be routed to the edge of touch screen 410 via routing trace 430A. The touch node electrodes and routing can be on the same material layer (as shown) or on different material layers (e.g., routing can be achieved via a different layer connected with vias) of touch screen 410. In some examples, touch screen 410 can sense the self-capacitance of the touch node electrodes or the mutual capacitance between the touch node electrodes to detect touch and/or proximity activity on touch screen 410. Although FIG. 4C illustrates touch electrodes with horizontal in-panel routing to left and right edges, it is understood that, in some examples, vertical in-panel routing to top and bottom edges can be used (e.g., as illustrated in FIGS. 6 and 8).

Although FIGS. 4A-4C illustrate rectangular touch electrodes, it is understood that other shapes are possible. As described herein, in some examples, non-rectangular touch electrodes, such as the combed-shaped touch electrodes illustrated in FIGS. 5A-5C, can be used for part or all of the touch sensor panel. The combed-shaped touch electrodes can include one or more protrusions to create a non-rectangular shaped touch electrode pattern. The combed-shaped touch electrodes can cause a staggering of protrusions of adjacent touch electrodes, so a touch sensor panel including such comb-shaped touch electrodes can be referred to as having a staggered touch electrode architecture.

In some examples, the interlocking protrusions of the comb-shaped touch electrodes can reduce error in location estimates of an object on the touch screen. Specifically, rectangular-shaped electrodes can experience an error in a location estimate that manifests as a sinusoidal wobble across the pitch of a touch electrode having an x-axis component and a y-axis component, optionally with the best accuracy at the center of the touch electrode pitch or at opposite ends of the touch electrode pitch. The interlocking protrusions of a staggered touch electrode architecture can reduce the sinusoidal wobble because a first portion of the error introduced on a first end of a first touch electrode can be opposite in magnitude from a second portion of the error introduced on a second end of a second touch electrode (where the first end of the first touch electrode is interlocked with the second end of the second touch electrode). For the combed-shaped touch electrodes illustrated in FIGS. 5A-5C, which have vertical protrusions (y-axis protrusions), the staggered touch electrode architecture can reduce the y-axis component of the location error (y-axis wobble), thereby improving touch sensing performance. Although primarily illustrated herein as comb-shaped touch electrodes having vertical protrusions (in the y-direction), it is understood that, in some examples, the comb-shaped touch electrodes can have horizontal protrusions (in the x-direction), thereby reducing the x-axis component of the location error (x-axis wobble), in addition to or instead of the vertical protrusions. In some examples, the interlocking protrusions of the comb shaped electrodes can increase the contact area between two adjacent touch electrodes (e.g., compared with two rectangular electrodes), thereby increasing the mutual capacitance between two adjacent electrodes configured for a mutual capacitance scan. In some examples, the area of a combed-shaped touch electrode can be the same as the area of a rectangular touch electrode.

In some examples, the comb-shaped touch electrode is parameterized by the width of the protrusions. In some examples, the comb-shaped touch electrode is parameterized by the height of the protrusions. In some examples, the comb-shaped touch electrode is parameterized by the number of protrusions. In some examples, the vertical protrusions may occur along the width of the touch electrode or may occur in a subset of the width of the touch electrode (e.g., in the center of the touch electrode). In some examples, the comb-shaped touch electrodes can be designed with a pattern enabling tessellation such that the comb-shaped touch electrode shape is uniform for a region of the touch sensor panel including comb-shaped touch electrodes (or across the majority or all of the touch sensor panel). Using a uniform shaped comb-shaped touch electrode can simplify manufacture. In some examples, the comb pattern is applied to all edges of a touch electrode (e.g., vertical and horizontal protrusions) or only to the top/bottom edges (e.g., vertical protrusions) or left/right edges (e.g., horizontal protrusions). In some examples, each protrusion in the comb-shaped pattern for the touch electrode has the same height and width. In some examples, some of the protrusions in the comb pattern can have different heights and/or widths. In some examples, the distance between the protrusions can be the same. In some examples, there can be a variation in the distance between the protrusions. In some examples, the protrusions decrease (or increase) in height towards a corner or an edge of the touch sensor panel. In some examples, the protrusions decrease (or increase) in width towards a corner or an edge of the touch sensor panel. In some examples, the number of protrusions decreases (or increases) towards a corner or an edge of the touch sensor panel. It is understood that, in some examples, one or multiple parameter(s) of the comb-shape touch electrode are optionally varied towards a corner or an edge of the touch sensor panel.

Figure 5A:
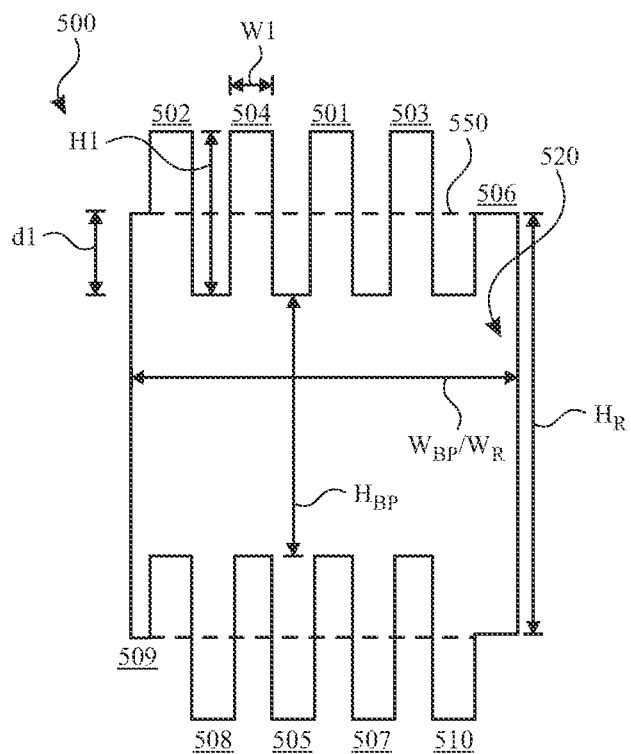
FIGS. 5A-5C illustrate example comb-shaped touch electrodes according to example of the disclosure.

FIG. 5A illustrates an example comb-shaped touch electrode 500 according to example of the disclosure. For reference, a rectangular touch electrode 550 is shown overlaid over comb-shaped touch electrode 500. Rectangular touch electrode 550 is represented partially by solid lines corresponding to the comb-shaped touch electrode 500 and partially by dashed line where the rectangular touch electrode 550 boundaries depart from the comb-shaped touch electrode 500. As shown in FIG. 5A, the comb-shaped touch electrode includes a rectangular base portion 520, with dimensions represented by the height $H_{BP}$ and width $W_{BP}$, and includes protrusions from rectangular base portion 520. The dimensions of the rectangular touch electrode 550 are represented by the height $H_R$ and width $W_R$ (e.g., which is shown to be the same as the width of the base portion, $W_{BP}$).

The protrusions can include protrusions extending from a first side of rectangular base portion 520, such as protrusion 502, protrusion 504, and protrusion 506 that extend from the top side of the rectangular base portion 520, and protrusions extending from a second side of rectangular base portion 520, such as protrusion 508, protrusion 509, and protrusion 510 that extend from the bottom side of the rectangular base portion 520. For the comb-shaped electrode 500, generally the protrusions can have a first height, H1, and a first width, W1. For example, protrusions 501, 503, 504, 505, 507, and 508, which are inset (e.g., toward the center of the comb-shaped touch electrode and away from the third/left and fourth/right sides of the comb-shaped touch electrode), can each have the first height and the first width. The remaining protrusions can have a dimension conforming to the first height or the first width in some portions and conforming to the shape of rectangular touch electrode 550 in other portions. For example, protrusions 502 and 510 can be tapered to include a protruding portion with the first height and the first width and a protruding portion with a different height (e.g., corresponding to the distance d1 between the top side of rectangular touch electrode 550 and rectangular base portion 520) (e.g., $d1=(H_R-H_{BP})/2$), and a width corresponding to the remainder of the width of rectangular touch electrode 550 (e.g., the remainder of $W_R$ between the edge of the protruding portion with the first height and the edge of the rectangular touch electrode 550). In a similar manner, protrusion 506 can have first width W1 and the different height (e.g., corresponding to d1 and the remainder of the height of rectangular touch electrode 550), and protrusion 509 can have the different height e.g., corresponding to d1 and the remainder of the height of rectangular touch electrode 550) and a width corresponding to the remainder of the width of rectangular touch electrode 550 (e.g., the remainder of $W_R$ at the edge of the rectangular touch electrode 550). In some examples, the different height (e.g., corresponding to d1) can be half the first height.

In some examples, the first height can be in a range between 50 μm and 5 mm. In some examples, the first height can be within a range of between 500 μm and 4 mm. In some examples, the first height can be in a range between 1 mm and 3.5 mm. In some examples, the first width can be in a range between 10 μm and 5 mm. In some examples, the first width can be within a range of between 100 μm and 2 mm. In some examples, the first height can be in a range between 500 μm and 1 mm.

In some examples, protrusions 506 and the protruding portion of protrusion 510 having the different height (e.g., not having the first height) can have the same dimensions. Similarly, protrusion 509 and the protruding portion of protrusion 502 having the different height (e.g., not having the first height) can have the same dimensions. In some examples, protrusion 506, protruding portion of protrusion 510 having the different height, protrusion 509, and the protruding portion of protrusion 502 having the different height can be disposed at edges whereas the remaining protrusions or portions of the protrusions having the first height can be inset. Additionally, the inset protrusions or portions of the protrusions having the first height can have an offset between the top and bottom protrusions (e.g., top protrusions of the first height can be horizontally offset from the bottom protrusions of the first height), whereas the protrusions on the edges not having the first height can be non-offset on the horizontal axis (vertically aligned). In some examples, the pitch distance (along the horizontal) between adjacent top protrusions having the first height can be the same as the pitch distance (along the horizontal) between adjacent bottom protrusions having the first height, and the offset between the top protrusions and the bottom protrusions can be half the pitch distance.

As shown in FIG. 5A, the horizontal gaps between adjacent protrusion on first side of the comb-shaped touch electrode can match the width of the protrusions on the second side of the comb-shaped touch electrode, opposite the first side. As shown in FIG. 5A, the top protrusions exist in a complementary pattern to the bottom protrusions (e.g., due to the half-pitch offset) such that two such comb-shaped touch electrode can be interlocking and self-tessellated. In this instance, where the two interlocking adjacent electrodes are identical, the comb-shaped touch electrode of FIG. 5C can be referred to as having a self-tessellating pattern. As such, in some examples, the same self-tessellating comb-shaped touch electrode can be used for implementing touch electrodes in a region of the touch sensor panel (e.g., one or more columns) or for each touch electrode in the touch sensor panel (possibly with the exception of the corner or edges (e.g., within a column of touch electrodes, a top edge of the touch sensor panel may have a touch electrode with protrusions on the bottom side only, and a bottom edge of the touch sensor panel may have a touch electrode with protrusions on the top side only).

Figure 5B:
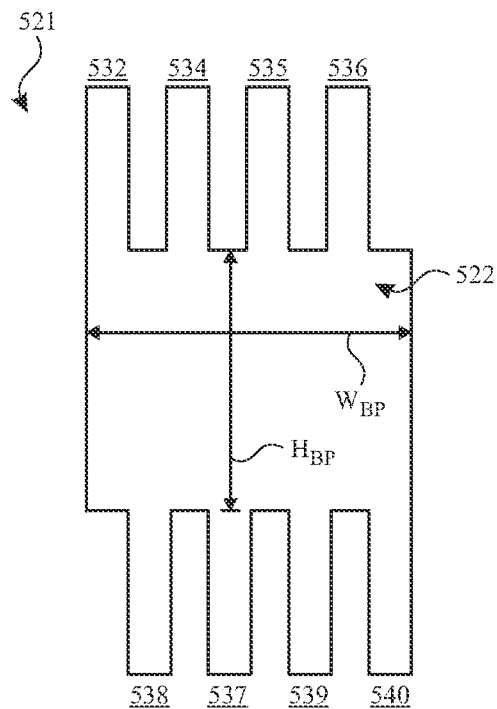

FIG. 5B illustrates an additional example self-tessellating comb-shaped touch electrode according to example of the disclosure. As shown in FIG. 5B, the comb-shaped touch electrode 521 includes a rectangular base portion 522 and includes protrusions from rectangular base portion 522. The protrusions can include protrusions extending from a first side of rectangular base portion 522, such as protrusion 532, protrusion 534, protrusion 535, and protrusion 536 that extend from the top side of the rectangular base portion 522, and protrusions extending from a second side of rectangular base portion 522, such as protrusion 537, protrusion 538, protrusion 539, and protrusion 540 that extend from the bottom side of the rectangular base portion 522. For the comb-shaped touch electrode 521 illustrated in FIG. 5B, all of the protrusions can have the same width and height.

Additionally, and as shown in FIG. 5B, the horizontal gaps between adjacent protrusion on first side of the comb-shaped touch electrode can match the width of the protrusions on the second side of the comb-shaped touch electrode, opposite the first side (e.g., top protrusions are horizontally offset from the bottom protrusions (e.g., offset by half the pitch distance)). As shown in FIG. 5B, the top protrusions exist in a complementary pattern to the bottom protrusions such that two such comb-shaped touch electrodes can be interlocking and self-tessellated. As such, in some examples, the same self-tessellating comb-shaped touch electrode can be used for implementing touch electrodes in a region of the touch sensor panel (e.g., one or more columns) or for each touch electrode in the touch sensor panel (possibly with the exception of the corner or edges (e.g., within a column of touch electrodes, a top edge of the touch sensor panel may have a touch electrode with protrusions on the bottom side only, and a bottom edge of the touch sensor panel may have a touch electrode with protrusions on the top side only).

Figure 5C:
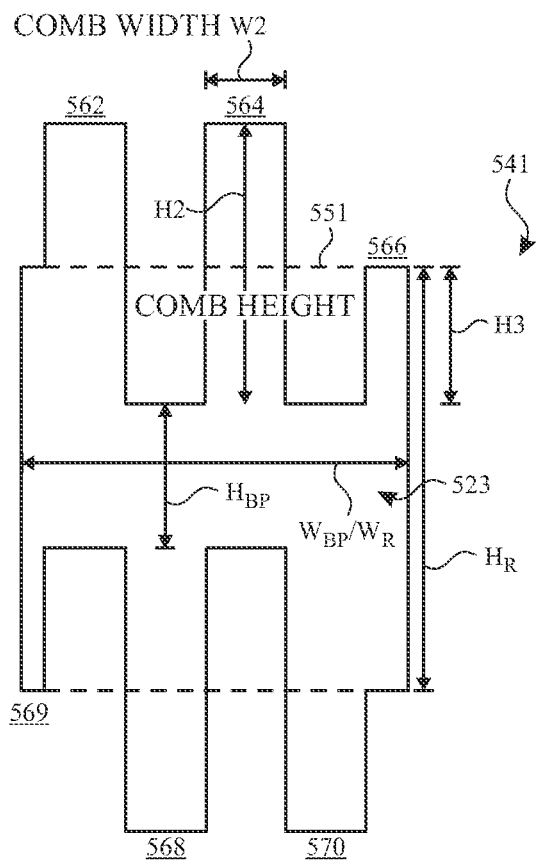

It is understood that although FIGS. 5A-5B illustrate four protrusions on two sides (e.g., top and bottom sides) that extend the first height, that different numbers of protrusions are possible. For example, FIG. 5C illustrates two protrusions on two sides that extend the second height. Other comb-shaped touch electrodes can have one, three, or more than four protrusions. Additionally, the height and width of the protrusions and the dimensions of the rectangular base portion can be varied. FIG. 5C illustrates an additional example self-tessellating comb-shaped touch electrode according to example of the disclosure. As shown in FIG. 5C, comb-shaped touch electrode 541 includes a rectangular base portion 523 and includes protrusions from rectangular base portion 523. The protrusions can include protrusions extending from a first side of rectangular base portion 523, such as protrusion 562, protrusion 564, and protrusion 566 that extend from the top side of the rectangular base portion 523, and protrusions extending from a second side of rectangular base portion 523, such as protrusion 568, protrusion 569, and protrusion 570 that extend from the bottom side of the rectangular base portion 523.

For the comb-shaped electrode 541, generally the protrusions can have a second height, H2, and a second width, W2. One or both of these dimensions can be different from the first height and first width of the protrusions in FIG. 5A. For example, inset protrusions 564 and 568 can each have the second height and the second width. The remaining protrusions can have a dimension conforming to the second height or the second width in some portions and conforming to the shape of rectangular touch electrode 551 in other portions. For example, protrusions 562 and 570 can be tapered to include a protruding portion with the second height and the second width, and a protruding portion with a third height, H3, corresponding to the distance between the top side of rectangular touch electrode 551 and rectangular base portion 523 (e.g., $H3=(H_R-H_{BP})/2$), and a width corresponding to the remainder of the width of rectangular touch electrode 551 (e.g., the remainder of $W_R$ between the edge of the protruding portion with the second height and the edge of the rectangular touch electrode 551). In a similar manner, protrusion 566 and 569 can have the third height H3, and each can have a width corresponding to the remainder of the width of rectangular touch electrode 551 (e.g., the remainder of $W_R$ at the edge of the rectangular touch electrode 551). In some examples, the third height can be half the second height.

In a similar manner as described with respect to FIG. 5A, in some examples, protrusions 566 and the protruding portion of protrusion 570 having the third height (e.g., not having the second height) can have the same dimensions. Similarly, protrusion 569 and the protruding portion of protrusion 562 having the third height (e.g., not having the second height) can have the same dimensions. In some examples, protrusion 566, protruding portion of protrusion 570 having the third height, protrusion 569, and the protruding portion of protrusion 562 having the third height can be disposed at edges whereas the remaining protrusions or portions of the protrusions having the second height can be inset. Additionally, the inset protrusions or portions of the protrusions having the second height can have an offset between the top and bottom protrusions (e.g., top protrusions of the second height can be horizontally offset from the bottom protrusions of the second height (e.g., offset by half the pitch distance)), whereas the protrusions on the edges having the third height can be non-offset.

As shown in FIG. 5C, the horizontal gaps between adjacent protrusion on first side of the comb-shaped touch electrode can match the width of the protrusions on the second side of the comb-shaped touch electrode, opposite the first side. As shown in FIG. 5C, the top protrusions exist in a complementary pattern to the bottom protrusions such that two such comb-shaped touch electrodes can be interlocking and self-tessellated. As such, in some examples, the same self-tessellating comb-shaped touch electrode can be used for implementing touch electrodes in a region of the touch sensor panel (e.g., one or more columns) or for each touch electrode in the touch sensor panel (possibly with the exception of the corner or edges (e.g., within a column of touch electrodes, a top edge of the touch sensor panel may have a touch electrode with protrusions on the bottom side only, and a bottom edge of the touch sensor panel may have a touch electrode with protrusions on the top side only).

Comparing FIG. 5C and FIG. 5A, it is understood that when rectangular touch electrodes of FIGS. 5A and 5C are the same dimensions that changing the height and/or width of the protrusions also changes the height of the base portion. Additionally, it is understood that increasing the width of the protrusions may necessitate a reduction in the number of protrusions (e.g., the larger width W2 compared to W1 requires fewer protrusions).

Although FIGS. 5A-5C illustrate protrusions on two opposite sides (e.g., top and bottom) of the touch electrode, that protrusions could additionally or alternatively be added to a second set of opposite sides (e.g., left and right) of the touch electrode. In some examples, the number and dimensions of the protrusions can be different on the top/bottom sides compared with the left/right sides of the touch electrode to allow for self-tessellating on two dimensions of the touch sensor panel (e.g. along column and along rows). As described herein, the self-tessellating comb-shaped touch electrodes can be implemented for a region of a touch sensor panel or an entire touch sensor panel. FIG. 6 illustrates a portion of an example touch sensor panel including comb-shaped touch electrodes (corresponding to comb-shaped touch electrodes 500 of FIG. 5A) and a routing scheme for the touch electrodes according to examples of the disclosure. The touch sensor panel can include a two-dimensional array of touch electrodes (e.g., row-column array). As shown in FIG. 6, a first column 601 can include comb-shaped touch electrode 602, comb-shaped touch electrode 606 and corresponding routing trace 605, comb-shaped touch electrode 610 and corresponding routing trace 609, and comb-shaped touch electrode 614 and corresponding routing trace 613. Comb-shaped touch electrode 602 can be at an edge of the touch electrode array and therefore may not include protrusions on the top edge and may not include a routing trace. The adjacent comb-shaped touch electrodes in column 601 interlock as described herein. For example, interlocking can be achieved due to the self-tessellation of the comb-shaped touch electrodes, in which with the one or more protrusions along the first side of a respective touch electrode are offset from the one or more protrusions along the second side along a second axis (e.g., horizontal axis), orthogonal to a first axis (e.g., vertical axis). The comb-shaped touch electrodes can be identical or nearly identical (e.g., apart from the routing and treatment at the top edge of comb-shaped touch electrode 602). Although not illustrated, in some examples, four additional comb-shaped touch electrodes can be implemented in column 601, but with routing to the opposite side of the touch sensor panel 600 and with the bottom edge of the bottom comb-shaped touch electrode not having protrusions. Although FIG. 6 illustrates four touch electrodes, and the touch sensor panel optionally includes an additional four touch electrodes, that this number and arrangement represents one example. For example, the touch senor panel can include any number of touch electrodes (e.g., less or more than 4 or 8 as shown and described with respect to FIG. 6). Furthermore, in some examples, the touch electrodes and corresponding routing in a column may not be symmetrical. For example, a column can optionally route all of the touch electrodes to one edge using routing traces, or asymmetrically route different numbers of touch electrodes to two edges (e.g., route three touch electrodes to the top edge and five touch electrodes to the bottom edge). The routing scheme of FIG. 6 allows for the touch electrodes and the routing traces to be formed in a single layer in a similar manner as illustrated with respect to FIG. 4C (but with the routing implemented horizontally in FIG. 4C compared with vertically in FIG. 6).

In some examples, the comb-shaped touch electrodes can be implemented in a similar manner for additional columns or for the entire touch sensor panel. For example, FIG. 6 illustrates a second column 603 including comb-shaped touch electrode 604, comb-shaped touch electrode 608 and corresponding routing trace 607, comb-shaped touch electrode 612 and corresponding routing trace 611, and comb-shaped touch electrode 616 and corresponding routing trace 615. Comb-shaped touch electrode 604 can be at an edge of the touch electrode array and therefore may not include protrusions on the top edge and may not include a routing trace. The adjacent comb-shaped touch electrodes in column 603 interlock as described herein. The comb-shaped touch electrodes can be identical or nearly identical (e.g., apart from the routing and treatment at the top edge of comb-shaped touch electrode 604). Although not illustrated, in some examples, four additional comb-shaped touch electrodes can be implemented in column 603, but with routing to the opposite side of the touch sensor panel 600 and with the bottom edge of the bottom comb-shaped touch electrode not having protrusions. It should be understood that the routing may not be required for a column along the edge in some examples, where routing can be performed in a border area on the side of the touch sensor panel rather than in the active area of the touch sensor panel.

Although FIG. 6 illustrates two columns 601 and 603 that use the comb-shaped touch electrode corresponding to comb-shaped touch electrode 500, it is understood that other comb-shaped touch electrode designs can be for the touch sensor panel. Additionally, it is understood that the comb-shaped touch electrodes may be different column to column. For example, a first column can use the comb-shaped touch electrode 500, a second column can use comb-shaped touch electrode 521, and/or a third column can use comb-shaped touch electrode 541. In some examples, number of protrusions, the width of the protrusions, and/or the height of the protrusions can vary from column to column. For example, a first column can include a first number of protrusions and a second column can include a second number of protrusions. For example, a first column can include a first width for protrusions and a second column can include a second width for protrusions. For example, a first column can include a first height for protrusions and a second column can include a second height for protrusions. In some examples, the characteristics can change gradually from column-to-column. For example, a first column may include comb-shaped touch electrodes with a first number of protrusions (e.g., two protrusions per edge), a second, adjacent column may include comb-shaped touch electrode with a second, different number of protrusions (e.g. three protrusions per edge), and a third column adjacent to the second column may include comb-shaped touch electrode with a third, different number of protrusion (e.g., four protrusions per edge). The dimensions (e.g., height and/or width) of the protrusions can also gradually change in a similar manner across columns.

Figure 7:
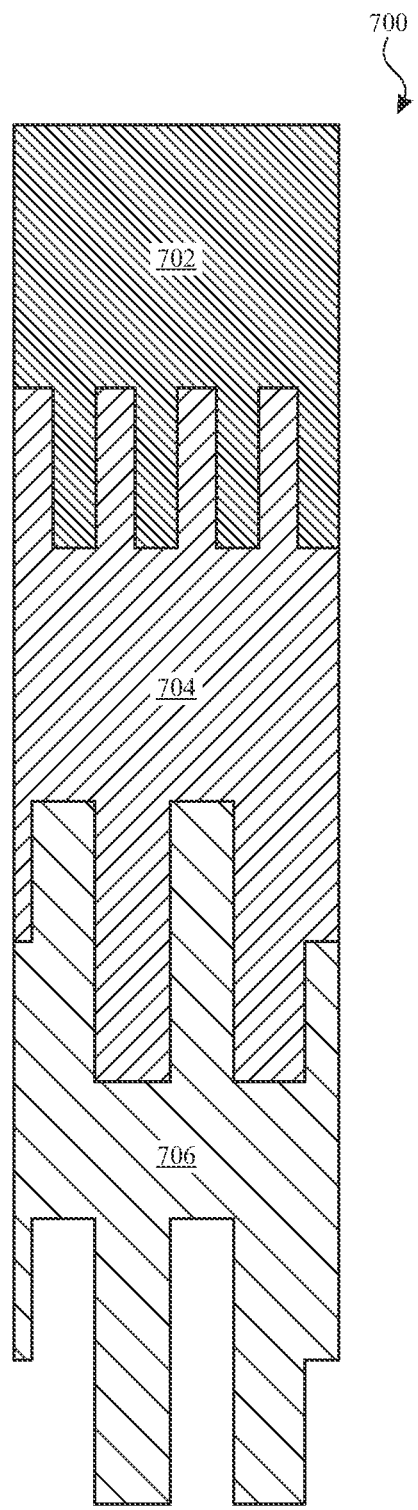
FIG. 7 illustrates a portion of an example column of a touch sensor panel including different comb-shaped touch electrodes according to examples of the disclosure.

Additionally or alternatively, Although FIG. 6 illustrates use of comb-shaped touch electrode with the same characteristics (e.g., corresponding to comb-shaped touch electrode 500), it is understood that the comb-shaped touch electrode characteristics can optionally be varied within a row (e.g., across the rows). FIG. 7 illustrates a portion of an example column of a touch sensor panel including different comb-shaped touch electrodes according to examples of the disclosure. As shown in FIG. 7, the portion of a column can include comb-shaped touch electrode 702, comb-shaped touch electrode 704, and comb-shaped touch electrode 706. Comb-shaped touch electrode 706 can correspond to comb-shaped touch electrode 541 of FIG. 5C. Comb-shaped touch electrode 704 can partially correspond to comb-shaped touch electrode 521 of FIG. 5B and partially correspond to comb-shaped touch electrode 541 of FIG. 5C. For example, the bottom of comb-shaped touch electrode 704 can correspond to comb-shaped touch electrode 541 to interlock with comb-shaped touch electrode 706 and the top of comb-shaped touch electrode 704 can correspond to comb-shaped touch electrode 521 to make with comb-shaped touch electrode 702, which has an interlocking comb shape at its bottom. As illustrated in FIG. 7, different comb characteristics (e.g., number, height, width, etc.) can be represented within a column by having a first side of a touch electrode with a first set of comb-characteristics (e.g., number, height, width, etc.) and a second side of the touch electrode with a second set of comb-characteristics (e.g., number, height, width, etc.). As mentioned, comb-shaped touch electrode 704 has different comb characteristic at its opposite sides to enable interlocking with the different comb characteristics of comb-shaped touch electrodes 702 and 706.

In some examples, some of the columns may include comb-shaped touch electrodes and some columns may include rectangular shaped touch electrodes. For example, FIG. 6 illustrates a third column, column 650, including rectangular touch electrodes without protrusions. For example, column 650 includes rectangular touch electrode 618, rectangular touch electrode 620 including corresponding routing trace 619, rectangular touch electrode 622 including corresponding routing trace 623, and rectangular touch electrode 624 including corresponding routing trace 627. Although not illustrated, in some examples, four additional rectangular touch electrodes can be implemented in column 650, but with routing to the opposite side of the touch sensor panel 600. In some examples, columns of comb-shaped touch electrodes can be implemented in one or more columns near edges of the touch sensor panel and columns of rectangular touch electrodes can be implemented toward the center of the touch sensor panel.

As described herein, the outer edges of the touch sensor panel may not have comb characteristics. For example, as described with respect to and illustrated in FIG. 6, the top edge (and optionally bottom edge, though not shown) of the column of comb-shaped touch electrode may not have protrusions. For example, comb-shaped touch electrodes 602 and 604 have comb characteristics on the bottom side, but not on the flat top side. In some examples, this characteristic can also be applied to left and right edges of the touch sensor panel. FIG. 8 illustrates a portion of another example touch sensor panel 800 including comb-shaped touch electrodes and a routing scheme for the touch electrodes according to examples of the disclosure. FIG. 8 illustrates columns 801 and 803 with comb-shaped column touch electrodes 802, 804, 806, 808, 810, 812, 814, and 816 corresponding to columns 601 and 603 with comb-shaped touch electrodes 602, 604, 606, 608, 610, 612, 614, and 616, the details of which are omitted for brevity. As described herein, in some examples, at the edge of the touch sensor panel, the comb-shaped touch electrodes are extended to be wider and/or taller to fill the maximum area available (e.g., for a rectangular touch sensor panel). As shown in FIG. 8, touch sensor panel 800 includes column 850 with comb-shaped touch electrode 830, comb-shaped touch electrode 832, comb-shaped touch electrode 834, and comb-shaped touch electrode 836. Comb-shaped touch electrodes 830-836 can be similar in height to the comb-shaped touch electrodes in columns 801 and 803 in the corresponding row, but comb-shaped touch electrodes 830-836 can include an edge extension, represented by edge extension region 860, that widens the comb-shaped touch electrode along the right edge of the touch sensor panel. In some examples, the comb characteristics are not extended to the edge of the touch sensor panel (e.g., the extension appears with rectangular characteristics. In some examples, the comb characteristics are extended to the edge of the touch sensor panel (not shown). In some examples, more comb characteristics could be added, the comb characteristics could be shifted to the center of the edge column, and/or the combs could be made wider in the edge column compared with a different column).

Although primarily illustrated and described as rectangular, it is understood that the rectangular touch electrodes, the comb-shaped touch electrodes with rectangular base portion and/or rectangular protrusions, and/or routing traces can have non-linear features (e.g., when features are observed at a magnified level). For example, for metal mesh touch electrodes, visibility of the boundaries of the touch electrodes can be reduced by reducing the linearity of the metal mesh along the boundaries of the touch electrodes. In some examples, the boundaries between the touch electrodes can be a zigzag or wave-like pattern. Additionally, or alternatively, although rectangular protrusions are shown in FIGS. 5A-8, it is understood that other shapes for the protrusions are possible. In some examples, the protrusions can also include steps and/or tapering.

As described herein, the use of comb-shaped touch electrodes provides for improved touch performance. For example, the accuracy of location detection using self-capacitance measurement of the touch sensor panel can be improved using the comb-shaped touch electrodes (e.g., reducing wobble). In some examples, measurements of mutual capacitance by the touch sensor panel can be improved using comb-shaped touch electrodes. In particular, as shown in FIG. 6, the contact area between neighboring touch electrode is increased between comb-shaped touch electrodes in columns 601 or 603 compared with the rectangular touch electrodes in column 650. As a result of the increased contact area, a larger mutual capacitance signal can be measured to provide for greater signal-to-noise ratio.

Therefore, according to the above, some examples of the disclosure are directed to a touch sensor panel. The touch sensor panel can comprise: a plurality of touch electrodes in a two-dimensional array. The plurality of touch electrodes can include a first touch electrode and a second touch electrode disposed along a first axis. The first touch electrode and the second touch electrode can each include one or more first protrusions along a first side and one or more second protrusions along a second side, opposite the first side. The one or more first protrusions along the first side can be offset along a second axis, orthogonal to the first axis, from the one or more second protrusions along the second side. The first touch electrode and the second touch electrode can tessellate such that the one or more first protrusions along the first side of the first touch electrode interlock with the one or more second protrusions along the second side of the second touch electrode.

Additionally or alternatively, in some examples, the one or more first protrusions can include a plurality of first protrusions and the one or more second protrusions include a plurality of second protrusions. Additionally or alternatively, in some examples, a first protrusion and a second protrusion of the one or more first protrusions can each extend a first height from the first side. Additionally or alternatively, in some examples, a first protrusion of the one or more first protrusions can extend a first height, and a second protrusion of the one or more first protrusions can extend a second height, different from the first height. Additionally or alternatively, in some examples, a third protrusion of the one or more first protrusions can extend the first height, the first protrusion and the second protrusion can be separated by a first distance along the second axis, and the second protrusion and the third protrusion can be separated by a second distance, different from the first distance, along the second axis.

Additionally, or alternatively, in some examples, the first touch electrode and the second touch electrode can each include one or more third protrusions along the first side and one or more fourth protrusions along the second side, and the one or more third protrusions along the first side and the one or more fourth protrusions along the second side can be aligned. The one or more first protrusions and the one or more second protrusions can extend a first height, and the one or more third protrusions and the one or more fourth protrusions can extend a second height, smaller than the first height.

Additionally, or alternatively, in some examples, the one or more first protrusions and the one or more second protrusions can be inset, and the one or more third protrusions and the one or more fourth protrusions can be located at an edge of the first touch electrode and the second touch electrode.

Additionally, or alternatively, in some examples, a first protrusion of the one or more third protrusions can have a first width, and a second protrusion of the one or more third protrusions can have a second width, different from the first width.

Additionally, or alternatively, in some examples, a first protrusion of the one or more first protrusions of the first touch electrode can extend upwards a first height, a first protrusion of the one or more second protrusions of the first touch electrode can extend downwards a second height, different from the first height, and a first protrusion of the one or more first protrusions of the second touch electrode can extend upwards the second height.

Additionally or alternatively, in some examples, the first protrusion of the one or more first protrusions of the first touch electrode can have a first width, the first protrusion of the one or more second protrusions of the first touch electrode can have a second width different from the first width, and a first protrusion of the one or more first protrusions of the second touch electrode can have the second width.

Additionally or alternatively, in some examples, the one or more first protrusions each have a height between 50 μm and 5 mm and a width between 10 μm and 5 mm. Additionally or alternatively, in some examples, the one or more first protrusions each have a height between 500 μm and 1 mm and a width between 1 mm and 4 mm.

Additionally or alternatively, in some examples, the first touch electrode can include a base portion from which the one or more first protrusions and the one or more second protrusions extend. Additionally or alternatively, in some examples, the base portion can be rectangular and the one or more first protrusions and the one or more second protrusions can be rectangular.

Additionally or alternatively, in some examples, the first touch electrode and the second touch electrode can have a same area.

Additionally or alternatively, in some examples, the plurality of touch electrodes can include a third touch electrode disposed along the first axis. The third touch electrode can include the one or more first protrusions along the first side and the one or more second protrusions along the second side. The one or more first protrusions along the first side can be offset along the second axis from the one or more second protrusions along the second side, and the second touch electrode and the third touch electrode can tessellate such that the one or more first protrusions along the first side of the second touch electrode interlock with the one or more second protrusions along the second side of the third touch electrode.

Additionally, or alternatively, in some examples, the plurality of touch electrodes can include a third touch electrode and a fourth touch electrode disposed along the first axis and offset along the second axis from the first touch electrode and the second touch electrode. The third touch electrode and the fourth touch electrode can each include the one or more first protrusions along the first side and the one or more second protrusions along the second side. The one or more first protrusions along the first side can be offset along the second axis from the one or more second protrusions along the second side. The third touch electrode and the fourth touch electrode can tessellate such that the one or more first protrusions along the first side of the third touch electrode interlock with the one or more second protrusions along the second side of the fourth touch electrode.

Additionally or alternatively, in some examples, the one or more first protrusions and the one or more second protrusions of the first touch electrode and the second touch electrode can include a same number of protrusions per side as the one or more first protrusions and the one or more second protrusions of the third touch electrode and the fourth touch electrode.

Additionally or alternatively, in some examples, the one or more first protrusions and the one or more second protrusions of the first touch electrode and the second touch electrode can include a different number of protrusions per side than the one or more first protrusions and the one or more second protrusions of the third touch electrode and the fourth touch electrode.

Additionally or alternatively, in some examples, the one or more first protrusions and the one or more second protrusions of the first touch electrode and the second touch electrode can have a same height and/or width as the one or more first protrusions and the one or more second protrusions of the third touch electrode and the fourth touch electrode.

Additionally or alternatively, in some examples, the one or more first protrusions and the one or more second protrusions of the first touch electrode and the second touch electrode can have a different height and/or width than the one or more first protrusions and the one or more second protrusions of the third touch electrode and the fourth touch electrode.

Additionally or alternatively, the plurality of touch electrodes can include a third touch electrode disposed along the first axis. The third touch electrode can include the one or more first protrusions along the second side and no protrusions along the first side. The second touch electrode and the third touch electrode can tessellate such that the one or more first protrusions along the first side of the second touch electrode interlock with the one or more first protrusions along the second side of the third touch electrode. The first side of the third touch electrode can be disposed at an edge of the two-dimensional array.

Additionally or alternatively, in some examples, the touch sensor panel can further comprise routing within the two-dimensional array.

Additionally or alternatively, in some examples, the one or more first protrusions can include between two and four protrusions. Additionally or alternatively, in some examples, the one or more first protrusions can include more than four protrusions.

Additionally or alternatively, in some examples, the one or more first protrusions have a pitch distance along the second axis, the one or more second protrusions have the pitch distance along the second axis, and the one or more first protrusions are offset along the second axis from the one or more second protrusions by half the pitch distance.

Some examples of the disclosure are directed toward a touch-sensitive device. The touch sensitive device can comprise: an energy storage device; communication circuitry; and any of the above touch sensor panel.

Although examples of this disclosure have been fully described with reference to the accompanying drawings, it is to be noted that various changes and modifications will become apparent to those skilled in the art. Such changes and modifications are to be understood as being included within the scope of examples of this disclosure as defined by the appended claims.

The invention claimed is:

1. A touch sensor panel, comprising:
a plurality of touch electrodes in a two-dimensional array, the plurality of touch electrodes including a first touch electrode and a second touch electrode disposed along a first axis, and a third touch electrode offset along the second axis from the first touch electrode;
wherein the first touch electrode and the second touch electrode each include one or more first protrusions along a first side and one or more second protrusions along a second side, opposite the first side;
wherein the one or more first protrusions along the first side are offset along a second axis, orthogonal to the first axis, from the one or more second protrusions along the second side;
wherein the first touch electrode and the second touch electrode tessellate such that the one or more first protrusions along the first side of the first touch electrode interlock with the one or more second protrusions along the second side of the second touch electrode; and
wherein the first touch electrode is connected to a first routing trace extending, along the first axis, from the first touch electrode to first edge of the two-dimensional array, the first routing trace being parallel to a second routing trace extending, along the first axis, from the second touch electrode to the first edge of the two-dimensional array; and
wherein a third side of the third touch electrode disposed opposite a respective routing trace of a respective touch electrode disposed along the first axis with the first touch electrode and the second touch electrode; and
wherein a fourth side of the third touch electrode, opposite the third side of the third touch electrode, comprises an edge extension to a second edge of the two-dimensional array, different than the first edge.

2. The touch sensor panel of claim 1, wherein the one or more first protrusions include a plurality of first protrusions and the one or more second protrusions include a plurality of second protrusions.

3. The touch sensor panel of claim 1, wherein:
a first protrusion and a second protrusion of the one or more first protrusions each extend a first height from the first side.

4. The touch sensor panel of claim 1, wherein:
a first protrusion of the one or more first protrusions extends a first height; and
a second protrusion of the one or more first protrusions extends a second height, different from the first height.

5. The touch sensor panel of claim 4, wherein:
a third protrusion of the one or more first protrusions extends the first height;
the first protrusion and the second protrusion are separated by a first distance along the second axis; and
the second protrusion and the third protrusion are separated by a second distance, different from the first distance, along the second axis.

6. The touch sensor panel of claim 1, wherein:
the first touch electrode and the second touch electrode each include one or more third protrusions along the first side and one or more fourth protrusions along the second side;
the one or more third protrusions along the first side and the one or more fourth protrusions along the second side are aligned;
the one or more first protrusions and the one or more second protrusions extend a first height; and
the one or more third protrusions and the one or more fourth protrusions extend a second height, smaller than the first height.

7. The touch sensor panel of claim 6, wherein:
the one or more first protrusions and the one or more second protrusions are inset; and
the one or more third protrusions and the one or more fourth protrusions are located at an edge of the first touch electrode and the second touch electrode.

8. The touch sensor panel of claim 1, wherein:
a first protrusion of the one or more first protrusions of the first touch electrode extends upwards a first height;
a first protrusion of the one or more second protrusions of the first touch electrode extends downwards a second height, different from the first height; and
a first protrusion of the one or more first protrusions of the second touch electrode extends upwards the second height.

9. The touch sensor panel of claim 8, wherein the first protrusion of the one or more first protrusions of the first touch electrode has a first width, the first protrusion of the one or more second protrusions of the first touch electrode has a second width different from the first width, and a first protrusion of the one or more first protrusions of the second touch electrode has the second width.

10. The touch sensor panel of claim 1, wherein the one or more first protrusions each have a height between 50 µm and 5 mm and a width between 10 µm and 5 mm.

11. The touch sensor panel of claim 1, wherein the first touch electrode includes a base portion from which the one or more first protrusions and the one or more second protrusions extend.

12. The touch sensor panel of claim 1, wherein:
the plurality of touch electrodes includes a fourth touch electrode disposed along the first axis;
the fourth touch electrode includes the one or more first protrusions along the first side and the one or more second protrusions along the second side;
the one or more first protrusions along the first side are offset along the second axis from the one or more second protrusions along the second side; and
the second touch electrode and the fourth touch electrode tessellate such that the one or more first protrusions along the first side of the second touch electrode interlock with the one or more second protrusions along the second side of the fourth touch electrode.

13. The touch sensor panel of claim 1, wherein:
the plurality of touch electrodes includes a fourth touch electrode and a fifth touch electrode disposed along the first axis and offset along the second axis from the first touch electrode and the second touch electrode;
the fourth touch electrode and the fifth touch electrode each includes the one or more first protrusions along the first side and the one or more second protrusions along the second side;
the one or more first protrusions along the first side are offset along the second axis from the one or more second protrusions along the second side; and
the fourth touch electrode and the fifth touch electrode tessellate such that the one or more first protrusions along the first side of the fourth touch electrode interlock with the one or more second protrusions along the second side of the fifth touch electrode.

14. The touch sensor panel of claim 13, wherein the one or more first protrusions and the one or more second protrusions of the first touch electrode and the second touch electrode include a same number of protrusions per side as the one or more first protrusions and the one or more second protrusions of the fourth touch electrode and the fifth touch electrode.

15. The touch sensor panel of claim 13, wherein the one or more first protrusions and the one or more second protrusions of the first touch electrode and the second touch electrode include a different number of protrusions per side than the one or more first protrusions and the one or more second protrusions of the fourth touch electrode and the fifth touch electrode.

16. The touch sensor panel of claim 13, wherein the one or more first protrusions and the one or more second protrusions of the first touch electrode and the second touch electrode have a same height and/or width as the one or more first protrusions and the one or more second protrusions of the fourth touch electrode and the fifth touch electrode.

17. The touch sensor panel of claim 13, wherein the one or more first protrusions and the one or more second protrusions of the first touch electrode and the second touch electrode have a different height and/or width than the one or more first protrusions and the one or more second protrusions of the fourth touch electrode and the fifth touch electrode.

18. The touch sensor panel of claim 1, wherein:
the plurality of touch electrodes includes a fourth touch electrode disposed along the first axis;
the fourth touch electrode includes the one or more first protrusions along the second side and no protrusions along the first side; and
the second touch electrode and the fourth touch electrode tessellate such that the one or more first protrusions along the first side of the second touch electrode interlock with the one or more first protrusions along the second side of the fourth touch electrode, wherein the first side of the fourth touch electrode is disposed at an edge of the two-dimensional array.

19. A touch-sensitive device comprising:

an energy storage device;

communication circuitry; and a touch sensor panel, the touch sensor panel comprising:

a plurality of touch electrodes in a two-dimensional array, the plurality of touch electrodes including a first touch electrode and a second touch electrode disposed along a first axis, and a third touch electrode offset along the second axis from the first touch electrode;

wherein the first touch electrode and the second touch electrode each include one or more first protrusions along a first side and one or more second protrusions along a second side, opposite the first side;

wherein the one or more first protrusions along the first side are offset along a second axis, orthogonal to the first axis, from the one or more second protrusions along the second side;

wherein the first touch electrode and the second touch electrode tessellate such that the one or more first protrusions along the first side of the first touch electrode interlock with the one or more second protrusions along the second side of the second touch electrode; and wherein the first touch electrode is connected to a first routing trace extending, along the first axis, from the first touch electrode to first edge of the two-dimensional array, the first routing trace being parallel to a second routing trace extending, along the first axis, from the second touch electrode to the first edge of the two-dimensional array; and wherein a third side of the third touch electrode disposed opposite a respective routing trace of a respective touch electrode disposed along the first axis with the first touch electrode and the second touch electrode; and wherein a fourth side of the third touch electrode, opposite the third side of the third touch electrode, comprises an edge extension to a second edge of the two-dimensional array, different than the first edge.

20. The touch-sensitive device of claim 19, wherein the one or more first protrusions include a plurality of first protrusions and the one or more second protrusions include a plurality of second protrusions.

\* \* \* \* \*